(12) United States Patent
Bakshe et al.

(10) Patent No.: US 10,080,231 B2
(45) Date of Patent: Sep. 18, 2018

(54) CHANNEL BANDWIDTH OPTIMIZATION FOR DYNAMIC NETWORK CONDITIONS

(71) Applicant: Avaya Inc., Basking Ridge, NJ (US)

(72) Inventors: Oren Bakshe, Kyryat-Ono (IL); Eyal Sayar, Kyryat-Ono (IL); Gal Keren, Ramat-Gan (IL); Ori Modai, Ramat Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 420 days.

(21) Appl. No.: 14/740,486

(22) Filed: Jun. 16, 2015

(65) Prior Publication Data
US 2016/0374094 A1    Dec. 22, 2016

(51) Int. Cl.
*H04W 72/04* (2009.01)
*H04W 24/10* (2009.01)
*H04W 28/22* (2009.01)

(52) U.S. Cl.
CPC ....... *H04W 72/0493* (2013.01); *H04W 24/10* (2013.01); *H04W 28/22* (2013.01)

(58) Field of Classification Search
CPC .. H04W 72/0493; H04W 24/10; H04W 28/22
See application file for complete search history.

(56) References Cited

U.S. PATENT DOCUMENTS

| | | | |
|---|---|---|---|
| 2013/0114426 A1* | 5/2013 | Polk | H04L 47/828 370/252 |
| 2014/0355442 A1* | 12/2014 | Isobe | H04L 69/16 370/235 |

\* cited by examiner

*Primary Examiner* — Gbemileke J Onamuti

(57) ABSTRACT

Embodiments disclosed herein provide systems and methods for optimizing channel bandwidth usage in a communication network from a sender. In a particular embodiment, a method provides transmitting first data on a first data channel from the sender to a receiver at a first rate that does not exceed an available amount of bandwidth on the communication network. The method further provides determining that the first data channel is attempting to transmit at a second rate that is higher than the first rate. Also, the method provides continuing to transmit the first data on the first data channel while increasing from the first rate to the second rate in increments until either the second rate is achieved or the available amount of bandwidth is reached.

20 Claims, 5 Drawing Sheets

CHANNEL BANDWIDTH OPTIMIZATION FOR DYNAMIC NETWORK CONDITIONS

TECHNICAL FIELD

Aspects of the disclosure are related to data transfer over a communication network and, in particular, to optimizing bandwidth usage in a network environment where available bandwidth is dynamic.

TECHNICAL BACKGROUND

Networked computer systems can transfer multiple data streams concurrently over a communication network. Even if the communication network is able to provide a constant amount of total bandwidth to one of those systems, which is not always the case as the total available bandwidth may change, the bandwidth used by each of the data streams in a multi-stream scenario may be dynamic. Thus, if one data stream attempts to increase its transfer rate, and thereby use more bandwidth, the bandwidth needed to transfer at that increased rate may not be available due to the bandwidth currently being used by other data streams. Likewise, if the total available network bandwidth changes, the amount of bandwidth needed to transfer at that increased rate may not be available regardless of the bandwidth used by other data streams. Going over the available bandwidth may cause quality issues for the data stream, such as lost or delayed data packets. Conversely, the quality of the information in the data may suffer if the bandwidth used by the data stream is kept artificially low (e.g. using greater compression, lower media resolution, etc.) to ensure the available bandwidth is not exceeded.

Accordingly, an ideal scenario for the data channel would be to use as much as possible of the bandwidth available. Current bandwidth estimators attempt to achieve this ideal scenario but cannot respond quickly enough when a data channel increases its bitrate to greater than what the available bandwidth allows. Consequently, packets are lost, even if only briefly, which degrades quality and causes degradation of the user experience at a system at the receiving end of the data channel.

OVERVIEW

Embodiments disclosed herein provide systems and methods for optimizing channel bandwidth usage in a communication network from a sender. In a particular embodiment, a method provides transmitting first data on a first data channel from the sender to a receiver at a first rate that does not exceed an available amount of bandwidth on the communication network. The method further provides determining that the first data channel is attempting to transmit at a second rate that is higher than the first rate. Also, the method provides continuing to transmit the first data on the first data channel while increasing from the first rate to the second rate in increments until either the second rate is achieved or the available amount of bandwidth is reached.

In some embodiments, the method provides transmitting one or more data channels contemporaneously with the first data channel from the sender to the receiver, wherein a combined rate of the one or more data channels and the first rate together do not exceed the available amount of bandwidth.

In some embodiments, the method provides receiving feedback at the sender from the receiver indicating whether the available amount of bandwidth is reached.

In some embodiments, the receiver executes an early congestion detection algorithm to determine whether the available amount of bandwidth is reached.

In some embodiments, a time period between increments is longer than a round trip delay on the communication network between the sender and the receiver.

In some embodiments, the method provides determining a size of each increment and a duration between each increment.

In some embodiments, each increment of the increments comprises a portion of the difference between the first rate and the second rate.

In some embodiments, the increments cause a linear increase from the first rate to the second rate.

In some embodiments, the method provides when the available amount of bandwidth is exceeded before the second rate is achieved, transmitting the first data on the first channel at a rate corresponding to the increment that immediately preceded the determination that the available amount of bandwidth is exceeded.

In another embodiment, a sender system is provided that includes a communication interface and a processing system. The communication interface is configured to transmit first data on a first data channel from the sender system to a receiver at a first rate that does not exceed an available amount of bandwidth on the communication network. The processing system is configured to determine that the first data channel is attempting to transmit at a second rate that is higher than the first rate. The communication interface is also configured to continue to transmit the first data on the first data channel while increasing from the first rate to the second rate in increments until either the second rate is achieved or the available amount of bandwidth is reached.

In yet another embodiment, a computer readable storage medium having instructions stored thereon is provided. The instructions, when executed by a sender system, direct the sender system to transmit first data on a first data channel from the sender system to a receiver at a first rate that does not exceed an available amount of bandwidth on the communication network. The instructions further direct the sender system to determine that the first data channel is attempting to transmit at a second rate that is higher than the first rate and continue to transmit the first data on the first data channel while increasing from the first rate to the second rate in increments until either the second rate is achieved or the available amount of bandwidth is reached.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Attempting to use more than the available bandwidth to transfer the data over the data channel on a communication network may result in degraded quality when using that data at a receiver. Specifically, the degraded quality may be caused by packet loss, packet delay, or some other issue that may arise from over-utilization of available bandwidth. Likewise, using less than the available bandwidth may also result in degraded quality if quality is being reduced at the sender to lessen the amount of bandwidth used even though more bandwidth is available.

In a particular example, a data channel may transfer data for a real-time video communication. If more than the available bandwidth for the data channel is used, then packets lost or delayed due to that over-utilization may cause problems when presenting that video at a receiver. In contrast, if less than the available bandwidth for the data channel is used, then the sender may be transferring the video at a lower quality (e.g. lower resolution, higher compression, etc.) than would otherwise be allowed by the available bandwidth.

In some cases, the amount of bandwidth used by a particular data channel may be dynamic and vary over time. For example, the amount of bandwidth used to stream data for a slide presentation may be low until there is a slide change in the presentation. During the slide change the amount of bandwidth used by the presentation stream may need to increase to transfer data representing the new slide. In a similar example, when a video is streaming over a data channel, the bandwidth needed to transfer the video increases whenever a reference frame to which other video frames refer is transferred.

Especially in situations where other data streams are being transferred as well (e.g. data channels for a video stream and an audio stream accompanying a presentation stream), which may themselves be dynamic, it is difficult for a sender to know how much bandwidth can be used for a particular data channel to maximize quality without over-utilizing the available bandwidth. Likewise, conditions on the network itself (e.g. traffic load, resource usage, device downtime, etc.) may cause the amount of bandwidth available to the data channels as a whole to be dynamic.

Figure 1:
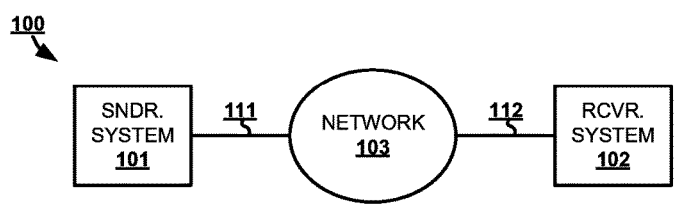
FIG. 1 illustrates a data transfer environment for optimizing channel bandwidth usage in a communication network from a sender.

FIG. 1 illustrates data transfer environment 100 in an operational scenario to optimize bandwidth usage by a data channel over a communication network. Data transfer environment 100 includes sender system 101, receiver system 102, and communication network 103. Sender system 101 and communication network 103 communicate over communication link 111. Receiver system 102 and communication network 103 communicate over communication link 112.

Sender system 101 may be a user device, network card, application server, or any other type of system capable of transferring data over communication network 103. Likewise, receiver system may be a user device, network card, application server, or any other type of system capable of receiving data over communication network 103. While only one receiver system is illustrated in environment 100, multiple receiver systems may receive data in data channels transferred from sender system 101.

When transferring data on a data channel over network 103 to receiver system 102, the rate in which that data can be transferred by sender system 101 is limited by available bandwidth on network 103, which may be a dynamic amount of bandwidth. Moreover, the amount of bandwidth available to that one data channel may be dependent upon the amount of bandwidth used by other data channels transferred from sender system 101, which also may be a dynamic amount of bandwidth. Therefore, as detailed below, sender system 101 determines what rate is allowed for a particular data channel based on the current dynamic state of bandwidth available for that data channel.

Figure 2:
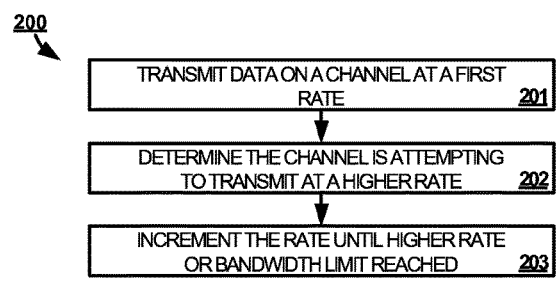
FIG. 2 illustrates a method of operating the data transfer environment to optimize channel bandwidth usage in a communication network from a sender.

FIG. 2 illustrates method 200 of data transfer environment 100 in an operational scenario to optimize bandwidth usage by a data channel over a communication network. Method 200 provides transmitting first data on a first data channel from sender 101 to receiver 102 at a first rate that does not exceed an available amount of bandwidth on communication network 103 (step 201). The available amount of bandwidth may be the total amount of bandwidth available to sender system 101 when the first data channel is the only data channel being transferred from sender system 101. However, if sender system 101 is transferring multiple data channels, as in a multi-stream scenario, then the available amount of bandwidth is the total amount of bandwidth available to sender system 101 less the bandwidth used to transfer the data channels other than the first data channel.

Method 200 then provides sender system 101 determining that the first data channel is attempting to transmit at a second rate that is higher than the first rate (step 202). The first data channel may be attempting to transmit at a higher rate because additional data needs to be transferred on the first data channel. For example, when a slide changes during a streaming presentation, an entire new slide must be transmitted, which typically requires sending more data than when the presentation sits on one slide for a period of time. In another example, a video conference may use lower quality video or display no video at all for a participant that is not currently speaking and, when that participant speaks, higher quality video for the participant is transferred requiring more data. Sender system 101 may determine that the channel is attempting to transmit at a higher rate by recognizing that more data is being delivered to a network interface of sender system 101 for the data channel, by being informed of the rate increase by an element of sender system 101 (e.g. an executing application) that generates the data, or by some other way of recognizing that the data will be transferred at a higher rate before the data is actually transferred at that higher rate.

Once the attempt to transmit at a higher rate is determined, method 200 provides sender system 101 continuing to transmit the first data on the first data channel while increasing from the first rate to the second rate in increments until either the second rate is achieved or the available amount of bandwidth is reached (step 203). In this way, the rate in which the first data is transferred increases gradually. Increasing the rate in gradual increments prevents sender system 101 from going too far over the available amount of bandwidth, which may cause quality to suffer. Specifically, in a dynamic network environment where the available amount of bandwidth changes often, sender system 101 does not know the exact amount of bandwidth available to the first data channel. Therefore, rather than simply transferring the first data channel at the second rate, which may end up going over the available amount of bandwidth, sender system 101 increments the transfer rate until it determines that the available amount of bandwidth has been reached. In one example, sender system 101 determines that the available amount of bandwidth has been reached based on feedback from receiver system 102 indicating that the amount of available bandwidth has been reached. However, other methods may also be used.

Figure 3:
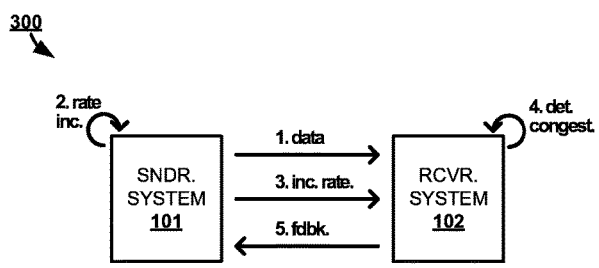
FIG. 3 illustrates an operation of the data transfer environment to optimize channel bandwidth usage in a communication network from a sender.

FIG. 3 illustrates operation 300 of data transfer environment 100 in an operational scenario to optimize bandwidth usage by a data channel over a communication network. Communication network 103 is not illustrated in operation 300 for clarity, however, it should be understood that the data transferred between sender system 101 and receiver system 102 traverses network 103. At step 1, sender system 101 transfers data to receiver system 102 on a data channel between system 101 and 102. The data is transferred at a first rate that consumes at least a portion of the bandwidth available between sender system 101 and receiver system 102. The bandwidth available between sender system 101 and receiver system 102 may be dynamic or constant, although, the portion of that bandwidth available to this specific data channel may be dynamic depending on the rate in which other data channels are transferring data. Therefore, if the data channel attempts to transfer data to receiver system 102 at a higher rate on the data channel, the dynamic aspect of the bandwidth available to do so causes uncertainty for sender system 101 about whether enough bandwidth is currently available for the higher rate.

When step 2 sender system 101 determines that data is attempting to transfer at a higher rate, sender system 101 determines increments by which the data transfer rate should be increased to reach the higher rate. The increments may progress linearly, exponentially, logarithmically, or in some other manner. Once the increments are determined, sender system 101 begins incrementing the rate for sending the data in accordance with the determined increments at step 3. During the transmission, receiver system 102 determines whether congestion is occurring on network 103 at step 4. Receiver system 102 may perform an early congestion detection algorithm. The algorithm may be based upon changes in packet delays between sender 101 and receiver 102 with increasingly longer packet delays indicating that congestion is occurring. Other algorithms may also be used.

When receiver system 102 determines congestion exists, receiver system 102 transfers feedback to sender system 101 indicating that congestion exists at step 5. Such feedback indicates to sender system 101 that the available bandwidth for transferring the data has been reached. Accordingly, the time between rate increase increments should preferably be set to a time greater than the round trip delay. Additionally, the time between increments may include any processing delay needed by receiver 102 to determine congestion. In this manner, the increment time allows sender system 101 to increment the transfer rate at step 3 and wait for receiver system 102 to report whether congestion is caused by that incremental rate increase at step 5. In some examples, no feedback at step 5 is assumed to indicate that no congestion was found by receiver 102. If sender system 101 is not notified that congestion exists, sender system 101 repeats step 3 and waits for feedback regarding this new increment at step 5. This process continues until the higher rate is reached or, if sender system 101 is notified of congestion before the higher rate is reached, then sender system 101 stops increasing the rate. In some examples, upon being notified of congestion, sender system 101 may decrease the data transfer rate back to the last increment that did not cause congestion. In other examples, congestion is detected before the rate is high enough for congestion to be a problem and sender system 101 is notified to stop increasing the rate. Thus, sender system 101 is able to substantially maximize the data transfer rate on a data channel when the amount of bandwidth available to that channel is dynamic.

Figure 4:
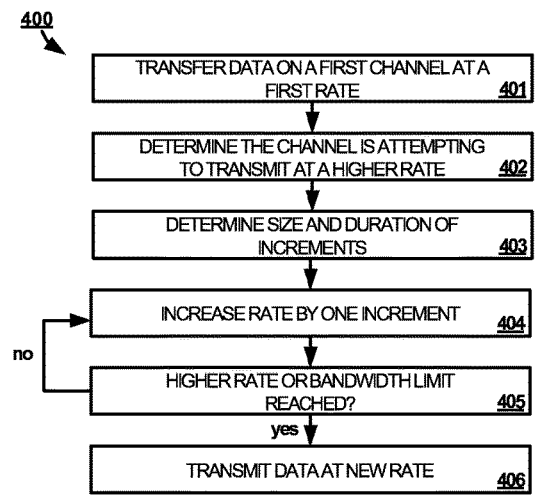
FIG. 4 illustrates a method of operating the data transfer environment to optimize channel bandwidth usage in a communication network from a sender.

FIG. 4 illustrates method 400 of data transfer environment 100 in an operational scenario to optimize bandwidth usage by a data channel over a communication network. Method 400 provides sender system 101 transfer data on a first data channel at a first rate (step 401). Sender system 101 then determines that the channel is attempting to transmit the data at a second, higher rate (step 402). In some cases, data may not be transferred prior to step 402, in those cases the data transfer rate at step 401 is effectively zero and the higher bitrate determined at step 402 is the above zero transfer rate for data on the first data channel.

Sender system 101 then determines the size of each increment and the duration between each increment (step 403). In some examples, the size, duration, or both may be predefined. In other examples, the size and the duration may be calculated by sender system 101. Sender system 101 may calculate the size and duration based upon the rate differential between the first rate and the second rate, a number of increments, a round trip delay between sender system 101 and receiver system 102, processing delay by receiver system 102, a time requirement for completing the increase (time-to-do), or some other variable that may effect increment size or duration. One or more of these variables may be predefined. For example, the time-to-do may be set to 1 second and the increments must therefore fit into that 1 second timeframe and be sized/timed in accordance with the other variables.

After determining the increment size and duration, sender system 101 increments the transfer rate by one increment (step 404). For example, if the first rate is 100 KB/s and the increment size is 5 KB/s, then the new incremented rate is 105 KB/s. Sender system then waits for the amount of time provided by the determined duration to receive feedback from receiver system 102 indicating that congestion has occurred (i.e. the available bandwidth has been reached) (step 405). If no indication of congestion is received, then sender system 101 returns to step 401 and increases the transfer rate by another increment. Continuing the example from above, the rate would be increased from 105 KB/s to 110 KB/s. Steps 404 and 405 then continue until step 405 receives feedback from receiver system 102 indicating that congestion has occurred or determines that the second rate has been reached, whichever occurs first. Again from the above example, if the second rate is 200 KB/s, sender system 101 continues to increment the rate by 5 KB/s until congestion is indicated or 200 KB/s is reached.

Once step 405 has determined that either congestion has occurred or the second rate has been achieved, sender system 101 transfers the data on the first channel at the new rate. In particular, the new rate may be the second rate (e.g. 200 KB/s from above). Alternatively, the new rate may be a rate immediately prior to step 405 determining that congestion has occurred, which maximizes the bandwidth used by the first data channel without over-utilizing bandwidth. Continuing the above example, when sender system 101 increases the rate from 165 KB/s to 170 KB/s and receives an indication of congestion at 170 KB/s, then sender system 101 may reduce the bandwidth back to 165 KB/s because no indication of congestion was received during that increment. Alternatively, bandwidth being used by one or more other data channels, if any, from sender system 101 may be reduced (i.e. reduce transmission rate) in order to allow the first data channel to increase its rate beyond 165 KB/s. The decision to reduce the bandwidth of other data channels may be based on a priority scheme (e.g. the first data channel may be of higher priority or importance than the other data channels that are reduced) or may be made in accordance with some other criteria. In some embodiments, if the desired higher second rate cannot be achieved due to congestion, then sender system 101 may make additional attempts to achieve the higher rate by returning to step 404 since additional bandwidth may be available at a later time.

Referring back to FIG. 1, sender system 101 comprises a computer system and communication interface. Sender system 101 may also include other components such as a router, server, data storage system, and power supply. Sender system 101 may reside in a single device or may be distributed across multiple devices. Sender system 101 may be a telephone, computer, e-book, mobile Internet appliance, network interface card, media player, game console, application server, proxy server, or some other network communication apparatus—including combinations thereof.

Receiver system 102 comprises a computer system and communication interface. Receiver system 102 may also include other components such as a router, server, data storage system, and power supply. Receiver system 102 may reside in a single device or may be distributed across multiple devices. Receiver system 102 may be a telephone, computer, e-book, mobile Internet appliance, network interface card, media player, game console, application server, proxy server, or some other network communication apparatus—including combinations thereof.

Communication network 103 comprises network elements that provide communications services to sender system 101 and receiver system 102. Communication network 103 may comprise switches, wireless access nodes, Internet routers, network gateways, application servers, computer systems, communication links, or some other type of communication equipment—including combinations thereof.

Communication links 111-112 use metal, glass, air, space, or some other material as the transport media. Communication links 111-112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-112 could be direct links or may include intermediate networks, systems, or devices.

Figure 5:
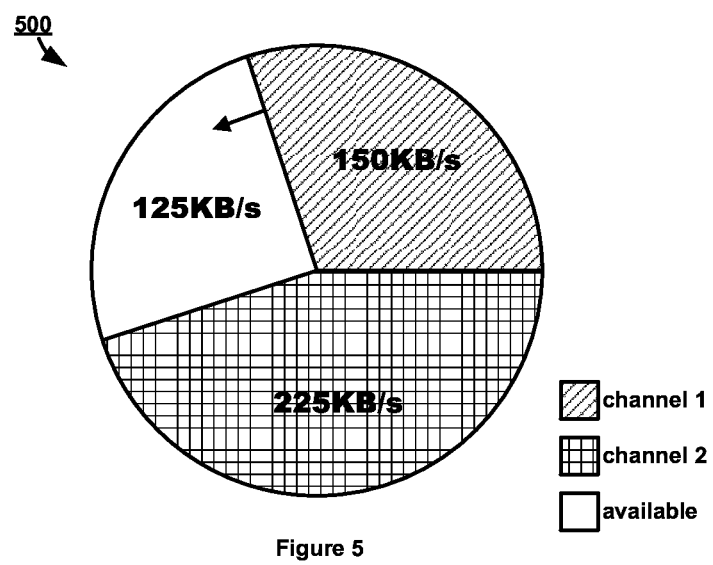
FIG. 5 illustrates a bandwidth usage chart in an operational scenario.

FIG. 5 illustrates chart 500 showing bandwidth availability in an example scenario of data transfer environment 100. In this example, sender system 101 is transferring data on two data channels, channel 1 and channel 2. The total bandwidth available to sender system 101 for transferring these two data channels is 500 KB/s. Channel 1 is currently transferring data at a rate of 150 KB/s and channel 2 is currently transferring data at a rate of 225 KB/s. Therefore, an additional 125 KB/s of bandwidth is available to sender system 101 should either channel 1, 2, or an additional channel not yet established need to transfer data at a higher rate than they are currently transferring.

While channels 1 and 2 are transmitting at their indicated rates, sender system 101 determines that channel 1 is attempting to transmit at a higher rate than 150 KB/s. Since sender system 101 is not aware that 125 KB/s of bandwidth is available to increase the transfer rate of channel 1, sender system 101 incrementally increases the rate of channel 1 until it is notified that the available bandwidth has been reached or the attempted higher rate is achieved. In this case, if channel 1 is attempting to increase to a rate greater than 275 KB/s (e.g. 300 KB/s), then sender system will be notified that bandwidth has been exceeded once channel 1 is incremented to 275 KB/s. However, if channel 1 is attempting to increase to a rate lower than 275 KB/s (e.g. 240 KB/s), then sender system 101 is able to increment the rate of channel 1 all the way up to that attempted rate.

Figure 6:
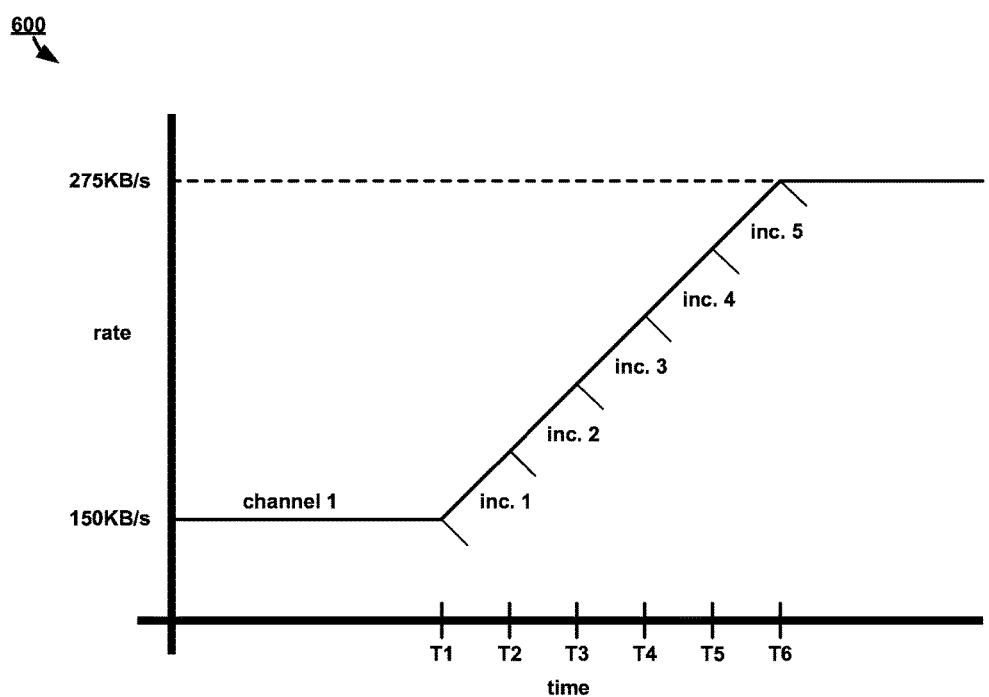
FIG. 6 illustrates a transfer rate graph in an operational scenario.

FIG. 6 illustrates transfer rate graph 600 showing an incremental increase in the data transfer rate of channel 1 from the example in FIG. 5. In particular, graph 600 shows channel 1 is transmitting at the same 150 KB/s shown in chart 500. Before time T1, sender system 101 determines that channel 1 is attempting to transfer data at an increased rate. In this example, that increased rate is 400 KB/s, which is over 275 KB/s. As has also been the case in the above embodiments, sender system 101 does not know exactly how much bandwidth is available for channel 1 to increase its data transfer rate due to the dynamic rate of channel 2 and also the possible dynamic nature of bandwidth provided by network 103.

Sender system 101 therefore determines increment size and duration to increase the rate of channel 1 by 250 KB/s. Specifically, sender system 101 determines that each increment should increase the transfer rate linearly by 25 KB/s. This increment may be calculated from sender system 101 having a time-to-do requirement of 1 second to increase the transfer rate of channel 1. Using that time-to-do, 8 increments of 25 KB/s would be needed to achieve 400 KB/s and the duration of each increment is 0.125 seconds. Thus, the time between each of times T1-T6 is 0.125 seconds. It should be understood that other increment sizes and time-to-dos could also be used. For instance, in some examples, there may not be a time-to-do requirement but, instead, a fixed increment size may be implemented.

In accordance with the above determined increment size, sender system 101 begins to increment the transfer rate for channel 1. At increment 1, the rate is increased to 175 KB/s from T1 to T2. Using the 0.125 second increment time from above, sender system 101 transfers at 175 KB/s for 0.125 seconds while waiting for an indication that the bandwidth available to channel 1 has been reached. Upon not receiving such an indication, sender system 101 increases the rate again in increment 2 to 200 KB/s for another 0.125 seconds. This process repeats itself until 275 KB/s is reached at increment 5. Put another way, between T1 and T2 sender system 101 transfers 21.875 KB and then between T2 and T3 sender system transfers 25 KB. Thus, in each increment, sender system 101 transfers 3.125 KB more than in the previous increment. Since 275 KB/s is the limit of bandwidth available to channel 1, sender system 101 receives an indication that the bandwidth is exceeded when it attempts to perform a sixth increment up to 300 KB/s. Thus, sender system 101 backs off to the transfer rate of channel 1 as it stood after increment 5 before the bandwidth was overutilized, which is 275 KB/s.

In the example, above sender system 101 is notified that the amount of bandwidth has been reached when received an indication that the bandwidth has been exceeded so that the rate of channel 1 can be backed off to a lower rate. In alternative examples, receiver system 102 may determine at 275 KB/s that congestion is going to be encountered. In response, receiver system 102 transfers an indication of such to sender system 101. Upon receiving the indication, sender system 101 does not increase the rate of channel 1 above 275 KB/s rather than attempting 300 KB/s as in the example above.

Since the transfer rate of channel 1 is dynamic, the transfer rate may go down at a later time or attempt to increase again and sender system 101 will need to repeat the processes described above. Similar processes may also be performed with respect to channel 2. Thus, as channel 1 and channel 2 both change transfer rates over time, sender system 101 can ensure that channel 1 and channel 2 in combination do not use more bandwidth than is available to sender system 101.

In alternative examples, once the sender system 101 receives and indication that the bandwidth is exceeded, sender system 101 may reduce the amount of bandwidth used by channel 2 in order to allow channel 1 to send at its desired 400 KB/s. Specifically, to allow channel 1 to increase 125 KB/s above the 275 KB/s at which no congestion was detected, sender system 101 reduces channel 2's rate by 125 KB/s to 200 KB/s. Once the bandwidth required by channel 1 is reduced, channel 2's rate can be increased back to where it was (i.e. 225 KB/s) or to a greater rate to make up for the rate reduction. The reduction of channel 2's rate in this example may be due to channel 1's priority being greater than that of channel 2.

Figure 7:
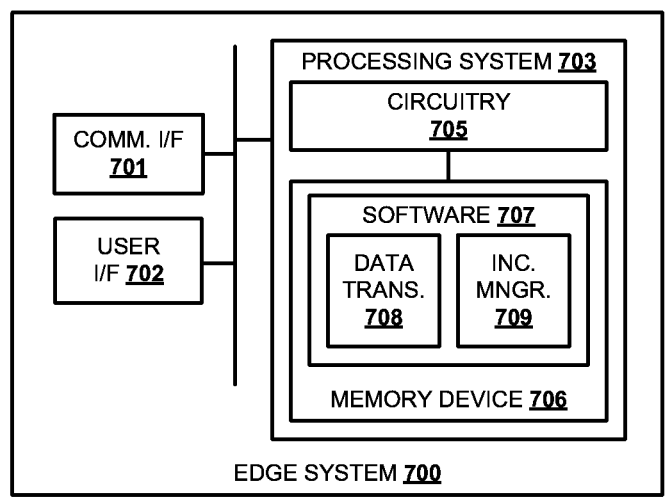
FIG. 7 illustrates a data sender system for optimizing channel bandwidth usage in a communication network from a sender.

FIG. 7 illustrates sender system 700. Sender system 700 is an example of sender system 101, although system 101 could use alternative configurations. Receiver system 102 may also use similar structure. Sender system 700 comprises wireless communication interface 701, user interface 702, and processing system 703. Processing system 703 is linked to wireless communication interface 701 and user interface 702. Processing system 703 includes processing circuitry 705 and memory device 706 that stores operating software 707. Sender system 700 may include other well-known components such as a battery and enclosure that are not shown for clarity. Sender system 700 may be a telephone, tablet, computer, e-book, mobile Internet appliance, media player, game console, application server, proxy server, or some other communication apparatus—including combinations thereof.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes data transfer module 708 and increment manager module 709. Operating software 707 may further include an operating system, utilities, drivers, network interfaces, applications, or some other type of software. When executed by processing circuitry 705, operating software 707 directs processing system 703 to operate sender system 700 as described herein.

In particular, data transfer module 708 directs processing system 703 to transmit first data on a first data channel from communication interface 701 to a receiver at a first rate that does not exceed an available amount of bandwidth on a communication network. Increment manager module 709 directs processing system 703 to determine that the first data channel is attempting to transmit at a second rate that is higher than the first rate and continue to transmit the first data on the first data channel while increasing from the first rate to the second rate in increments until either the second rate is achieved or the available amount of bandwidth is reached.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of optimizing channel bandwidth usage in a communication network from a sender, the method comprising:
   transmitting first data on a first data channel from the sender to a receiver at a first rate that does not exceed an available amount of bandwidth on the communication network;
   determining that the first data channel is attempting to transmit at a second rate that is higher than the first rate; and
   continuing to transmit the first data on the first data channel while increasing from the first rate to the second rate in increments until either the second rate is achieved or the available amount of bandwidth is reached, wherein the sender does not know whether the second rate can be achieved within the available amount of bandwidth until either the second rate is achieved or the available amount of bandwidth is reached.

2. The method of claim 1, further comprising:
   transmitting one or more data channels contemporaneously with the first data channel from the sender to the receiver, wherein a combined rate of the one or more data channels and the first rate together do not exceed the available amount of bandwidth.

3. The method of claim 1, further comprising:
   receiving feedback at the sender from the receiver indicating whether the available amount of bandwidth is reached.

4. The method of claim 3, wherein the receiver executes an early congestion detection algorithm to determine whether the available amount of bandwidth is reached.

5. The method of claim 3, wherein a time period between increments is longer than a round trip delay on the communication network between the sender and the receiver.

6. The method of claim 1, further comprising:
determining a size of each increment and a duration between each increment.

7. The method of claim 1, wherein each increment of the increments comprises a portion of the difference between the first rate and the second rate.

8. The method of claim 1, wherein the increments cause a linear increase from the first rate to the second rate.

9. The method of claim 1, further comprising:
when the available amount of bandwidth is exceeded before the second rate is achieved, transmitting the first data on the first channel at a rate corresponding to the increment that immediately preceded the determination that the available amount of bandwidth is exceeded.

10. A sender system for optimizing channel bandwidth usage in a communication network, the system comprising:
a communication interface configured to transmit first data on a first data channel from the sender system to a receiver at a first rate that does not exceed an available amount of bandwidth on the communication network;
a processing system configured to determine that the first data channel is attempting to transmit at a second rate that is higher than the first rate; and
the communication interface configured to continue to transmit the first data on the first data channel while increasing from the first rate to the second rate in increments until either the second rate is achieved or the available amount of bandwidth is reached wherein the sender does not know whether the second rate can be achieved within the available amount of bandwidth until either the second rate is achieved or the available amount of bandwidth is reached.

11. The sender system of claim 10, further comprising:
the communication interface configured to transmit one or more data channels contemporaneously with the first data channel from the sender to the receiver, wherein a combined rate of the one or more data channels and the first rate together do not exceed the available amount of bandwidth.

12. The sender system of claim 10, further comprising:
the communication interface configured to receive feedback at the sender from the receiver indicating whether the available amount of bandwidth is reached; and
upon receiving the feedback, the communication interface configured to decrease a rate that at least one other data channel is transmitted an amount at least equal to the amount of bandwidth required for the second rate and contemporaneously increase transmission of the second data channel up to the second rate.

13. The sender system of claim 12, wherein the receiver executes an early congestion detection algorithm to determine whether the available amount of bandwidth is reached.

14. The sender system of claim 12, wherein a time period between increments is longer than a round trip delay on the communication network between the sender system and the receiver.

15. The sender system of claim 10, further comprising:
the processing system configured to determine a size of each increment and a duration between each increment.

16. The sender system of claim 10, wherein each increment of the increments comprises a portion of the difference between the first rate and the second rate.

17. The sender system of claim 10, wherein the increments cause a linear increase from the first rate to the second rate.

18. The sender system of claim 10, further comprising:
the communication interface configured to, when the available amount of bandwidth is exceeded before the second rate is achieved, transmit the first data on the first channel at a rate corresponding to the increment that immediately preceded the determination that the available amount of bandwidth is exceeded.

19. A computer readable storage medium having instructions stored thereon for optimizing channel bandwidth usage in a communication network, the instructions, when executed by a sender system, direct the sender system to:
transmit first data on a first data channel from the sender system to a receiver at a first rate that does not exceed an available amount of bandwidth on the communication network;
determine that the first data channel is attempting to transmit at a second rate that is higher than the first rate; and
continue to transmit the first data on the first data channel while increasing from the first rate to the second rate in increments until either the second rate is achieved or the available amount of bandwidth is reached, wherein the sender does not know whether the second rate can be achieved within the available amount of bandwidth until either the second rate is achieved or the available amount of bandwidth is reached.

20. The computer readable storage medium of claim 19, wherein the instructions further direct the sender system to:
transmit one or more data channels contemporaneously with the first data channel from the sender to the receiver, wherein a combined rate of the one or more data channels and the first rate together do not exceed the available amount of bandwidth.

* * * * *